United States Patent [19]

Ryan

[11] Patent Number: 5,406,626
[45] Date of Patent: Apr. 11, 1995

[54] RADIO RECEIVER FOR INFORMATION DISSEMENATION USING SUBCARRIER

[75] Inventor: John O. Ryan, Cupertino, Calif.
[73] Assignee: Macrovision Corporation, Mountain View, Calif.
[21] Appl. No.: 31,763
[22] Filed: Mar. 15, 1993
[51] Int. Cl.$^6$ .......................... H04L 9/00; H04B 1/06
[52] U.S. Cl. ......................................... 380/9; 380/49; 380/50; 455/45; 364/401; 364/408
[58] Field of Search ................ 340/905; 364/401, 408, 364/409, 424.01; 379/100; 455/45

[56] References Cited

U.S. PATENT DOCUMENTS

| | | | |
|---|---|---|---|
| 4,247,908 | 1/1981 | Lockhart et al. | 395/325 |
| 4,323,921 | 4/1982 | Guillou | 380/23 X |
| 4,473,824 | 7/1984 | Claytor | 340/825.27 |
| 4,677,552 | 6/1987 | Sibley, Jr. | 364/408 |
| 4,682,368 | 7/1987 | Takahashi | 455/38.1 |
| 4,852,086 | 7/1989 | Eastmond et al. | 370/69.1 |
| 4,868,866 | 9/1989 | Williams, Jr. | 380/49 |
| 4,942,616 | 7/1990 | Linstroth et al. | 381/51 |
| 5,086,510 | 2/1992 | Guenther et al. | 455/90 |
| 5,131,020 | 7/1992 | Liebeany et al. | 379/59 |
| 5,133,010 | 7/1992 | Borth et al. | 381/38 |
| 5,146,473 | 8/1992 | Critchlow et al. | 375/8 |
| 5,146,612 | 9/1992 | Grosjean et al. | 455/45 |
| 5,152,011 | 9/1992 | Schwob | 455/158.5 |
| 5,177,685 | 1/1993 | Davis et al. | 364/443 |
| 5,182,555 | 1/1993 | Sumner | 340/905 |
| 5,239,700 | 8/1993 | Guenther et al. | 455/158.4 |

FOREIGN PATENT DOCUMENTS

| | | | |
|---|---|---|---|
| 0373386 | 6/1990 | European Pat. Off. | G08G 1/0967 |
| 2651352 | 3/1991 | France | G08G 1/096 |
| 4024132 | 2/1992 | Germany | H04L 9/18 |
| 8901429 | 2/1989 | WIPO | B60R 11/02 |

OTHER PUBLICATIONS

Daniel Kumin, "RBDS Radios on The Way, But Most Suppliers Cautious", *Twice* 4, Jan. 1993, p. 9.
Mark Fleischmann, "Now it's digital FM radio. (The Digital Age Comes Home)", *Popular Science*, Nov. 1990 v237 n5 p77 (3).
Paul Rocheleau, Radio on Wheels (book reviews), Consumers Union of the U.S., 1991; First 3 paragraphs only.
Russ Lockwood, "FM sidebands: tuning in to Wall Street" *Personal Computing*, 27 Apr. 1990 v14 n4 p80 (5).

*Primary Examiner*—Bernarr E. Gregory
*Attorney, Agent, or Firm*—Skjerven, Morrill, MacPherson, Franklin & Friel; Norman R. Klivans, Jr.; Gerow D. Brill

[57] ABSTRACT

A radio receiver receives FM subcarrier transmissions, and stores the transmitted textual information in a random access memory. The information is typically news, weather, sports, entertainment or other information of interest. A user interface allows selection from the memory of the stored information via a set of menus controlling a hierarchical database, so as to access particular items of information. A speech synthesizer accepts the accessed textual information items and transforms them into spoken speech. The user interface is either by voice or a single or multi-position switch allowing scanning through and selection from the menu items.

21 Claims, 1 Drawing Sheet

RADIO RECEIVER FOR INFORMATION DISSEMENATION USING SUBCARRIER

BACKGROUND OF THE INVENTION

1. Field of the Invention

This invention relates to a radio broadcasting system for transmission of alphanumeric information to a specially adapted receiver.

2. Description of the Prior Art

Numerous systems transmit information on FM radio subcarriers. See for instance, U.S. Pat. No. 5,152,011 issued to Schwob, Sep. 29, 1992. Also known is a single sideband communication system with FM data capability for transmission of analog voice signals. See U.S. Pat. No. 4,852,086 issued to Eastmond et al., Jul. 20, 1989.

Also known is FM radio sideband broadcasting to specially adapted computers for transmission for instance of news and financial information. Commercially available products available from Mainstream, Telemet, and DeskTop Data broadcast data over FM radio sidebands for receipt by personal computers equipped with special FM radio receivers and software. Typically information is transmitted in digital form, received, and stored in the computer memory for access by the computer user using menu driven software. The data is displayed on the computer screen in conventional alphanumeric form. One product in this category is News Edge, a news service available from DeskTop Data, Inc. of Waltham, Mass. which delivers a number of news and financial information services to a user via FM radio sideband. Software provided with the product scans incoming information and when the incoming information meets parameters set by the user, the information is saved to disk and/or displayed on the computer screen.

These systems have the disadvantage of requiring a personal computer as a platform, and providing information only on a computer screen. The usual computer skills are needed in order to operate such systems, which tend to be quite expensive.

SUMMARY OF THE INVENTION

A system for receiving information via radio sidebands (subcarriers) includes an FM subcarrier tuner which extracts encrypted data from a radio transmission. Conditional access circuitry decrypts the data which is stored in a random access memory. A user interface (either a simple manual or voice control) driving a hierarchy of menus allows a user to access the information by indicating his selections from the menus; the system then extracts the information from the database in decrypted text form. A speech synthesizer converts the text information to an audio signal for provision to the user via a loud speaker or earphones.

This system may be standalone or a part of an existing radio receiver, sharing components of the radio receiver. One embodiment of the user control is a four way switch (the positions corresponding for instance to the cursor control keys on a computer) for selection from and scanning through the menus. Typically the system includes approximately four megabits of memory, sufficient to store information for 10 hours of audio. The information is for example news, sports, weather, cultural information, advertisements, or commercial listings. The information is transmitted in digital form as (encrypted) ASCII text which is readily stored and voice synthesized.

Other features are user control over the speed at which the synthesized speech is output, and a channel skipping tuner for finding the particular FM radio station subcarrier on which the service is provided. An optional printer produces hard copy output, and the speech synthesizer may under either automatic or user control produce different types of voices. Also, the user has the opportunity to preselect database items, thereby to construct a personal profile so as to extract particular information without having to scan through all the menus.

DETAILED DESCRIPTION OF THE INVENTION

Figure 1:
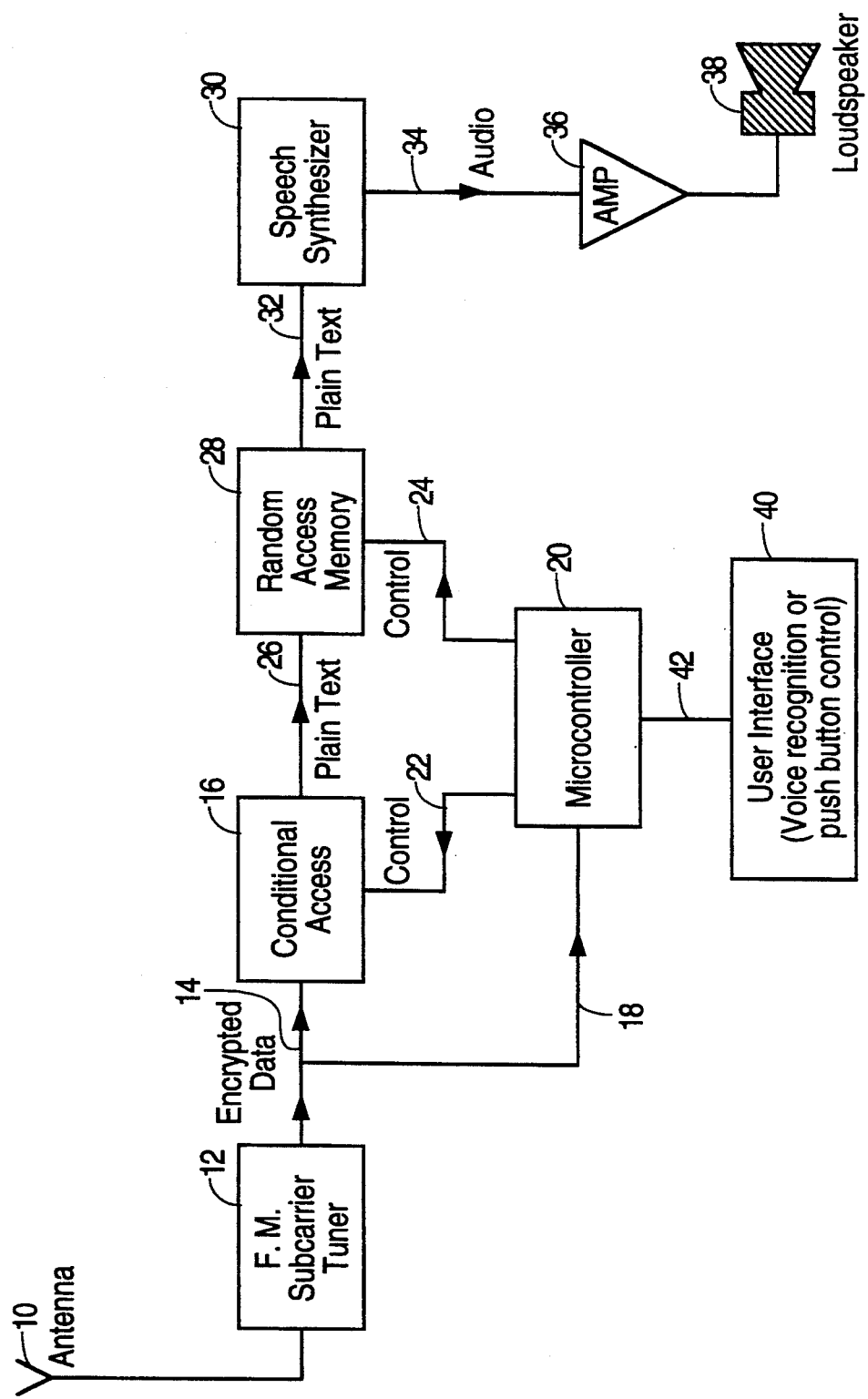
FIG. 1 shows a block diagram of an apparatus in accordance with the present invention.

FIG. 1 shows a device in accordance with one embodiment of the invention. Conventional FM radio antenna 10 (as used for instance in automobile or portable radios) provides a received radio signal to FM subcarrier tuner 12 of the type well known in the art for extracting an FM subcarrier signal. As is well known, these subcarrier signals are typically transmissions of digitized data on subcarriers leased from commercial FM radio stations. FM subcarrier tuner 12 provides on line 14 the extracted data (which typically is encrypted) to conditional access circuitry 16.

Conditional access circuitry 16 ensures that the data is decrypted only if the proper key or command has been provided, as described below. Conditional access circuitry 16 decrypts the received data (as authorized by microcontroller 20 over lines 22) and in one embodiment provides plain ASCII text (or other alphanumeric text) on line 26 for storage to conventional integrated circuit random access memory (RAM) 28. In one embodiment RAM 28 includes approximately 4 megabits of storage capacity. This information is accessed under control of microcontroller (microprocessor) 20 via control signals at lines 24, to determine which particular items of data stored in RAM 28 are to be provided via output line 32 to speech synthesizer 30.

In other embodiments, the received data is stored as encrypted data or in another convenient form and converted to a form usable by the speech synthesizer prior to being converted to speech. In this case, each data item would be "tagged" with an unencrypted designation to allow retrieval of the stored encrypted data from the database.

Speech synthesizer 30 is of the type commercially available for example from Berkeley Speech Technologies, Berkeley, Calif. This system converts ASCII text into understandable and well modulated audio analog signals. The audio analog signals are provided on line 34 to a conventional audio amplifier 36 and hence to a loud speaker or earphones 38 to be listened to by the user.

User interface 40 inputs commands on line 42 to microcontroller 20 to determine which items of data from random access memory 28 are to be listened to.

The transmitted information is categorized, stored, and accessed in a conventional hierarchial database in RAM 28 under control of microcontroller 20.

In one embodiment user interface 40 is a voice activated command system. For instance the device is turned on and initialized by the user's spoken "ON"

command. It then responds by vocally announcing via loud speaker 38 the major database categories available e.g. "NEWS", "SPORTS", "ENTERTAINMENT", etc. When the desired category has been announced the user responds by saying "YES". The device then announces again the sub-categories of the selected major category, and the user again selects the desired sub-category with a spoken "YES" until the specific item needed is accessed. For example, the category and sub-category path to the latest news regarding the General Motors Corporation might be "NEWS . . . BUSINESS . . . NATIONAL . . . AUTOMOTIVE . . . GM." The path to a review of the recent movie Aladdin might be "ENTERTAINMENT . . . HOLLYWOOD . . . MOVIE REVIEWS . . . ALADDIN." Typically items will be reached after four or five "YES" responses from the user. In one embodiment three additional spoken commands by the user such as "BACK" "STOP" and "GO" are sufficient to provide the user effective and rapid control of the system.

In another embodiment a switch assembly having for instance four positions (up, down, left, right) corresponding to the familiar cursor control on a computer, with each position indicating one of four commands, is provided for user manual operation. This switch may be adapted to attach to the steering wheel of an automobile, for use by the driver. The control is linked to the rest of the device by wire, infrared, or ultrasonically, as is a conventional television remote control.

Another version uses a one-position control switch. The user briefly depresses the switch to select the category or item as announced or to scan through the menus. Briefly depressing the switch while an actual data item is being read executes "stop." Depressing it again then executes "go." Holding the switch down for a second or two executes "back" at any time, to return to a predetermined point in the database.

The FM subcarrier tuner 12, microcontroller 20, conditional access circuitry 16 and random access memory 28 typically remain powered at all times (by battery power if necessary) to receive a continuous update of the broadcast database, and thereby to store current news in RAM 28.

In one version the device of FIG. 1 is a portable unit (similar to a portable radio) and includes the user voice or manual interface. In another embodiment the device of FIG. 1 is build into a conventional portable radio or automobile radio, sharing where possible common components.

In one embodiment user interface 40 has a speed control to determine the output speed of speech synthesizer 30. Speech synthesizer 30 may receive information on line 32 faster than normal speaking speed. It is well known that people can understand speech at faster than normal speech rates. Thus the user by pushing a button on the receiver unit or providing the proper verbal command increases the speech speed, so as to obtain information faster, analogous to skimming printed material.

In the embodiment using a voice activated user interface 40, the number of commands provided is limited (for instance to 5 to 10) and hence a relatively simple commercially available voice input recognition circuit is sufficient.

In another embodiment, the user interface for an automobile-based system is associated with a heads-up display, expected to be available in various automobiles in the near future. This provides visual display of the database menu items analogous to a computer screen, to allow faster access to the database menus.

Advantageously, by transmitting and storing the data in text or alphanumeric form (even though encrypted), the required bandwidth of the transmission channel is vastly reduced, as are the memory requirements, thereby substantially reducing the component cost. A typical transmission speed is one kilobaud, as is now used in FM subcarrier transmissions of financial and news information. This is sufficient to download in approximately one hour the needed four megabits of data to random access memory 28.

In use, after purchase of the unit the user programs it to the frequencies of the local stations providing the transmissions. There may be multiple such stations in one area, due to the limited transmission distance of FM radio. A channel skipping feature (as is now available commercially in various radios) in one embodiment included in microcontroller 20 seeks out stations having a particular signature or frequency, to maintain reception even when moving from the transmission area of one station carrying the service to the transmission area of a second station carrying the service. It would take less than a minute for the system to scan the entire FM band looking for the signature transmission.

The data encryption/access is accomplished in several ways. In one embodiment a simple addressed on/off command is transmitted (without data encryption) to disable individual units belonging to people who have not paid the required monthly subscription fee to receive the service.

In a more sophisticated encryption system where it is believed there is a problem of manufacture and sale of unauthorized units, then proper data encryption is used, requiring receipt of a key and decryption of the data with decryption circuitry. Hence unauthorized units without such dedicated decryption circuitry would not be operative at all.

In one embodiment of an encryption system, (analogous to pay-per-view cable TV encryption), decryption keys are delivered by radio transmission. Each individual receiver unit has a unique "hidden" key of for instance 40 to 50 binary digits in read only memory. Each unit also has a "public" nonhidden serial number. All transmitted data is conventionally encrypted using a master key which is changed periodically, both to force users to pay for the service and to enhance security. Each receiver unit must receive a master key to decrypt the data transmission.

The master key is transmitted to each unit as follows: Periodically, the transmission of the data is interrupted to transmit key information. The key information is a series of packets, one packet for each individual receiver unit, with each packet including (1) an address field which is the public serial number of a particular unit; followed by (2) a second field which is the current master key encrypted with the unique "hidden key" of the unit having that particular serial number.

The receivers look for these packets (which are denoted by a particular signature or occur at particular times to avoid confusion with the data). When a particular unit receives the packet including its own address (public serial number), it stores and decrypts the subsequent encrypted master key field, thereby obtaining the master key, in order to decrypt subsequent encrypted data.

In a second encryption system embodiment, a uniquely encrypted master key for each individual receiver is physically delivered to each user periodically (such as once a month). The key could be entered into each unit by a keypad, or the key could be embodied in an electronically readable card or device inserted into a suitable port in the receiver.

In another embodiment, speech synthesizer 30 is controlled to provide a variety of particular voices. These voices are selected by the user, i.e. to be male/female or other voices, or the system is programmed via microcontroller 20 to select different voices for different types of or categories of information.

The device of FIG. 1 as incorporated in a conventional radio uses antenna 10 of the radio. The FM subcarrier tuner 12 is in addition to the conventional radio tuner or could be part of the radio tuner. The other blocks of FIG. 1 (with the exception of amplifier 36 and loud speaker 38) are unique to this system and are added components to a conventional radio.

The above description is illustrative and not limiting; further modifications will be apparent to one of ordinary skill in the art.

I claim:

1. A receiver system comprising:
   a radio tuner for demodulating data from a radio signal;
   a memory for storing the demodulated data as a database;
   a user interface for providing a set of hierarchical menus describing the database, and for accepting selections from the set of menus;
   a controller for selecting data from the database in response to the accepted selections and outputting the selected data in an alphanumeric form; and
   a speech synthesizer for converting the selected data from alphanumeric form to an analog audio signal representing spoken words.

2. The device of claim 1, wherein the radio tuner demodulates the data from an FM radio station carrier.

3. The device of claim 2, wherein the radio tuner includes means for channel skip tuning to a particular FM radio station sideband.

4. The device of claim 1, wherein the memory stores the entire database.

5. The device of claim 1, wherein the extracted data is encrypted, and further comprising a decryptor for decrypting the extracted data.

6. The device of claim 5, wherein the decryptor is enabled by a key received by the radio tuner.

7. The device of claim 5, wherein the decryptor is enabled by a key device connected to the decryptor.

8. The device of claim 1, wherein the alphanumeric form uses an ASCII code that represents alphanumeric text.

9. The device of claim 1, wherein the user interface is voice activated.

10. The device of claim 1, wherein the user interface includes:
    a manual input device for mounting on an automobile steering wheel; and
    a wireless link from the manual input device to the controller.

11. The device of claim 1, wherein the user interface includes a control for determining a speed at which the speech synthesizer outputs the analog audio signal.

12. The device of claim 1, wherein the memory stores at least four megabits of the data.

13. The device of claim 1, further comprising:
    an amplifier connected to the speech synthesizer for amplifying the analog audio signal; and
    means for converting the amplified signal to sound.

14. The device of claim 1, further comprising means for connecting the radio tuner to a radio receiver set.

15. The device of claim 1, further comprising a device for making a printed copy of the selected data.

16. The device of claim 1, wherein the speech synthesizer includes means for generating a plurality of voices.

17. The device of claim 16, wherein the means for generating a plurality of voices includes voice selection depending on a category of the selected data.

18. The device of claim 16, wherein the means for generating a plurality of voices includes voice selection in response to user control.

19. The device of claim 1, further comprising means for designating by a user a hierarchy for the database.

20. A method for transmitting alphanumeric data via a radio signal to a receiver, comprising:
    broadcasting the radio signal;
    demodulating the alphanumeric data from the radio signal;
    determining if the data is encrypted and if encrypted, decrypting the alphanumeric data;
    storing the demodulated data in a memory as a database;
    generating a set of menus describing the database;
    selecting items of the alphanumeric data the set of menus;
    selecting from the memory portions of the stored data in response to the selected items, the portions being in alphanumeric form; and
    converting the selected portions from the alphanumeric form to an analog audio signal representing spoken words.

21. A receiver system comprising:
    a radio tuner for receiving a radio signal;
    a demodulator within said radio tuner to detect data in the received signal;
    conditional access circuitry for determining whether the data is encrypted;
    a decryptor for decrypting any of the data that is encrypted;
    a memory for storing the data;
    a user interface for generating a set of menus describing the data, and for accepting selections from the set of menus;
    a controller for selecting data in response to the accepted selections and outputting the selected data in alphanumeric form; and
    a speech synthesizer for converting the selected data from an alphanumeric form to an analog audio signal representing spoken words.

* * * * *